(12) United States Patent
Sprangers et al.

(10) Patent No.: US 11,049,166 B2
(45) Date of Patent: Jun. 29, 2021

(54) SYSTEMS AND METHODS FOR MANAGING PRODUCT RECOMMENDATIONS AND AFFILIATE LINKS

(71) Applicant: Glamhive, Inc., Seattle, WA (US)

(72) Inventors: Stephanie Sprangers, Seattle, WA (US); Dylan Todd Howerter, Seattle, WA (US)

(73) Assignee: Glamhive, Inc., Seattle, WA (US)

( * ) Notice: Subject to any disclaimer, the term of this patent is extended or adjusted under 35 U.S.C. 154(b) by 194 days.

(21) Appl. No.: 16/034,194

(22) Filed: Jul. 12, 2018

(65) Prior Publication Data

US 2019/0019235 A1    Jan. 17, 2019

Related U.S. Application Data

(60) Provisional application No. 62/531,460, filed on Jul. 12, 2017.

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0631* (2013.01); *G06Q 10/087* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 2009/0043674 A1* | 2/2009 | Minsky | ............. | G06Q 30/0633 705/26.8 |
| 2014/0279208 A1* | 9/2014 | Nickitas | ............. | G06Q 30/0631 705/26.7 |
| 2014/0344102 A1* | 11/2014 | Cooper | ............. | G06Q 30/0631 705/26.7 |
| 2016/0027088 A1* | 1/2016 | Jensen | ............. | G06Q 30/0631 705/26.7 |

* cited by examiner

*Primary Examiner* — Mila Airapetian
(74) *Attorney, Agent, or Firm* — Christensen O'Connor Johnson Kindness PLLC

(57) ABSTRACT

A set of computing methods and systems are provided that allow geographically distributed stylists to review and recommend "looks" for geographically distributed users, and that allow for asynchronous access by both the stylist and the user. Using "looks" instead of individual products allows the system to build an understanding of what products complement each other when worn together. Analytical insights of trends, style recommendations, customer behavior, and other internal data can be made available to stylists in order to help stylists more efficiently provide recommendations to multiple customers. Further, embodiments of the present disclosure may allow recommendations to be based around a look, but do not require that recommended products be depicted in an image associated with the look. In this way, greater flexibility can be achieved than if only products depicted in the look image were recommended.

8 Claims, 14 Drawing Sheets

SYSTEMS AND METHODS FOR MANAGING PRODUCT RECOMMENDATIONS AND AFFILIATE LINKS

CROSS-REFERENCE(S) TO RELATED APPLICATION(S)

This application claims the benefit of Provisional Application No. 62/531,460, filed Jul. 12, 2017, the entire disclosure of which is hereby incorporated by reference herein for all purposes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for providing and tracking product recommendations is provided. The system comprises a stylist computing device; a client computing device; and a recommendation management system. The recommendation management system comprises one or more computing devices configured to receive one or more client preferences from the client computing device; transmit the one or more client preferences to the stylist computing device; receive a look image and one or more product selections associated with the look image from the stylist computing device; and transmit a style board including the look image and the one or more product selections to the client computing device.

In some embodiments, a computer-implemented method of providing affiliate link-enabled product recommendations is provided. A computing device receives a plurality of product records from at least one retailer system. The computing device normalizes the plurality of product records. The computing device stores the normalized product records in a product data store. The computing device receives, from a stylist computing device, a selection of normalized product records to include in a style board. The computing device transmits the style board to a client computing device.

In some embodiments, a non-transitory computer-readable medium having computer-executable instructions stored thereon is provided. The instructions, in response to execution by one or more processors of a computing device, cause the computing device to perform actions for providing affiliate link-enabled product recommendations. The actions comprise receiving, by the computing device, a plurality of product records from at least one retailer system; normalizing, by the computing device, the plurality of product records; storing, by the computing device, the normalized product records in a product data store; adding, by the computing device, an affiliate link to each normalized product record; receiving, by the computing device from a stylist computing device, a selection of normalized product records to include in a style board; and transmitting, by the computing device, the style board to a client computing device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In some existing systems, product subscriptions are provided and recommended items may be delivered to customers. However, in all of the existing subscription services, the process of recommendations is primarily based upon a canvas (flat) approach. Recommendations are put together from a set of persona, and provided back to customers in a two-dimensional view. What is desired are systems that can base recommendations on "looks" that have been shared or distributed by others as a starting point for recommendations.

A set of computing methods and systems that allow geographically distributed stylists to review and recommend "looks" for geographically distributed users, and that allow for asynchronous access by both the stylist and the user, are provided herein. Using "looks" instead of individual products allows the system to build an understanding of what products complement each other when worn together, thus allowing recommendations of entire "looks" instead of isolated product-by-product recommendations. Analytical insights of trends, style recommendations, customer behavior, and other internal data can be made available to stylists, in order to help stylists more efficiently provide recommendations to multiple customers. Further, embodiments of the present disclosure may allow recommendations to be based around a "look," but do not require that recommended products be depicted in an image associated with the "look." In this way, greater flexibility can be achieved than if only products depicted in the look image were recommended.

Figure 1:
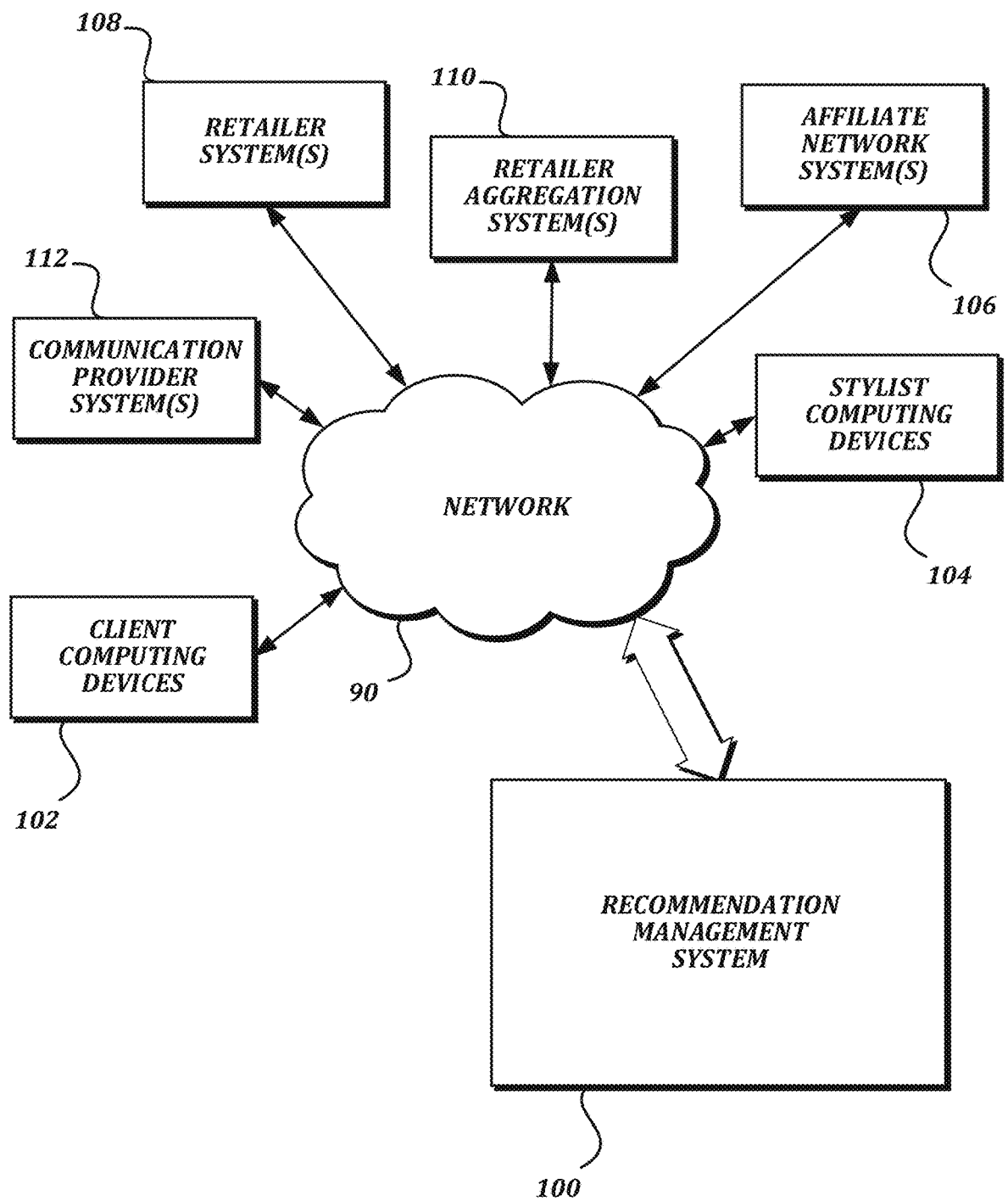
FIG. 1 is a block diagram that illustrates an example embodiment of an ecosystem that includes a recommendation management system according to various aspects of the present disclosure.

FIG. 1 is a block diagram that illustrates an example embodiment of an ecosystem that includes a recommendation management system according to various aspects of the present disclosure. As shown, the recommendation management system 100 communicates with various other devices and systems via a network 90. The network 90 may include any number of suitable communication technologies including but not limited to Ethernet, Wi-Fi, WiMAX, 3G, 4G, LTE, and the Internet. Some of the other devices and systems that the recommendation management system 100 may interact with include, but are not limited to, client computing devices 102, stylist computing devices 104, communication provider systems 112, retailer systems 108, retailer aggregation systems 110, and affiliate network systems 106.

In some embodiments, the client computing devices 102 are used by clients to interact with the recommendation management system 100 in order to obtain recommendations from stylists. Clients may also use client computing devices 102 to purchase products from one or more retailer systems 108, and may have their activities tracked by one or more affiliate network systems 106. In some embodiments, client computing devices 102 may also be used to communicate directly with stylist computing devices 104 once such communication is mediated by the recommendation management system 100. In some embodiments, client computing devices 102 may be any suitable computing device having at least one processor, a memory, a display, and a network adapter capable of communicating with the network 90. Some examples of client computing devices 102 include, but are not limited to, desktop computing devices, laptop computing devices, smartphones, and tablet computing devices.

In some embodiments, stylist computing devices 104 are used by stylists to interact with the recommendation management system 100 in order to learn client preferences, to search for products relevant to those preferences, and to provide recommendations to clients. In some embodiments, stylist computing devices 104 may be similar types of computing devices as the client computing devices 102, at least in that any suitable computing device having at least one processor, a memory, a display, and a network adapter capable of communicating with the network 90 may be used. As with the client computing devices 102, some examples of stylist computing devices 104 include, but are not limited to, desktop computing devices, laptop computing devices, smartphones, and tablet computing devices.

In some embodiments, communication provider systems 112 provide high-bandwidth and/or high-volume communication between other systems, and/or may bridge between different types of networks. For example, the recommendation management system 100 may communicate via TCP/IP or other Internet-centric communication technology with communication provider systems 112 that provide SMS messaging services, including but not limited to Twilio, in order to send SMS messages to client computing devices 102 and/or stylist computing devices 104. In some embodiments, communication provider systems 112 may be used by the recommendation management system 100 to facilitate direct communication between the client computing devices 102 and the stylist computing devices 104. For example, communication provider systems 112 that provide video conferencing services, including but not limited to FaceTime systems or Google Hangout systems, may be used to allow the client computing devices 102 and the stylist computing devices 104 to communicate directly with each other.

In some embodiments, retailer systems 108 provide products for purchase, and process orders submitted by client computing devices 102. In some embodiments, retailer systems 108 may provide user interfaces such as web sites, apps, and/or the like that allow clients to browse product pages and submit orders. In some embodiments, retailer systems 108 may also provide programmatic interfaces to the offered products, which may be consumed by the recommendation management system 100. Some non-limiting examples of retailer systems 108 include systems provided by department stores such as Nordstrom (nordstrom.com) or Barney's New York (barneys.com); online-only retailers such as Farfetch (farfetch.com); and individual brands such as Forzieri (forzieri.com).

In some embodiments, retailer aggregation systems 110 may collect product listings from multiple retailer systems 108 and combine them into a single product listing that can be consumed by the recommendation management system 100. In some embodiments, the retailer aggregation systems 110 may also add tracking information to product links included in the product listings, thus allowing the recommendation management system 100 to obtain click-through information for products that it displays without using an affiliate network system 106. Some non-limiting examples of retailer aggregation systems 110 include, but are not limited to, Rakuten Affiliate Network (formerly LinkShare), and CJ Affiliate (formerly Commission Junction).

In some embodiments, affiliate network systems 106 provide link tracking and other services that allow the recommendation management system 100 and the retailer systems 108 to track client behavior. This tracking information may also be used to compensate the recommendation management system 100 for purchases that are consummated after a client follows a product link to a retailer system 108 that was provided by the recommendation management system 100. Rakuten Affiliate Network and CJ Affiliate may also be non-limiting examples of affiliate network systems 106.

Further description of the actions performed by each of these systems is provided below.

Figure 2:
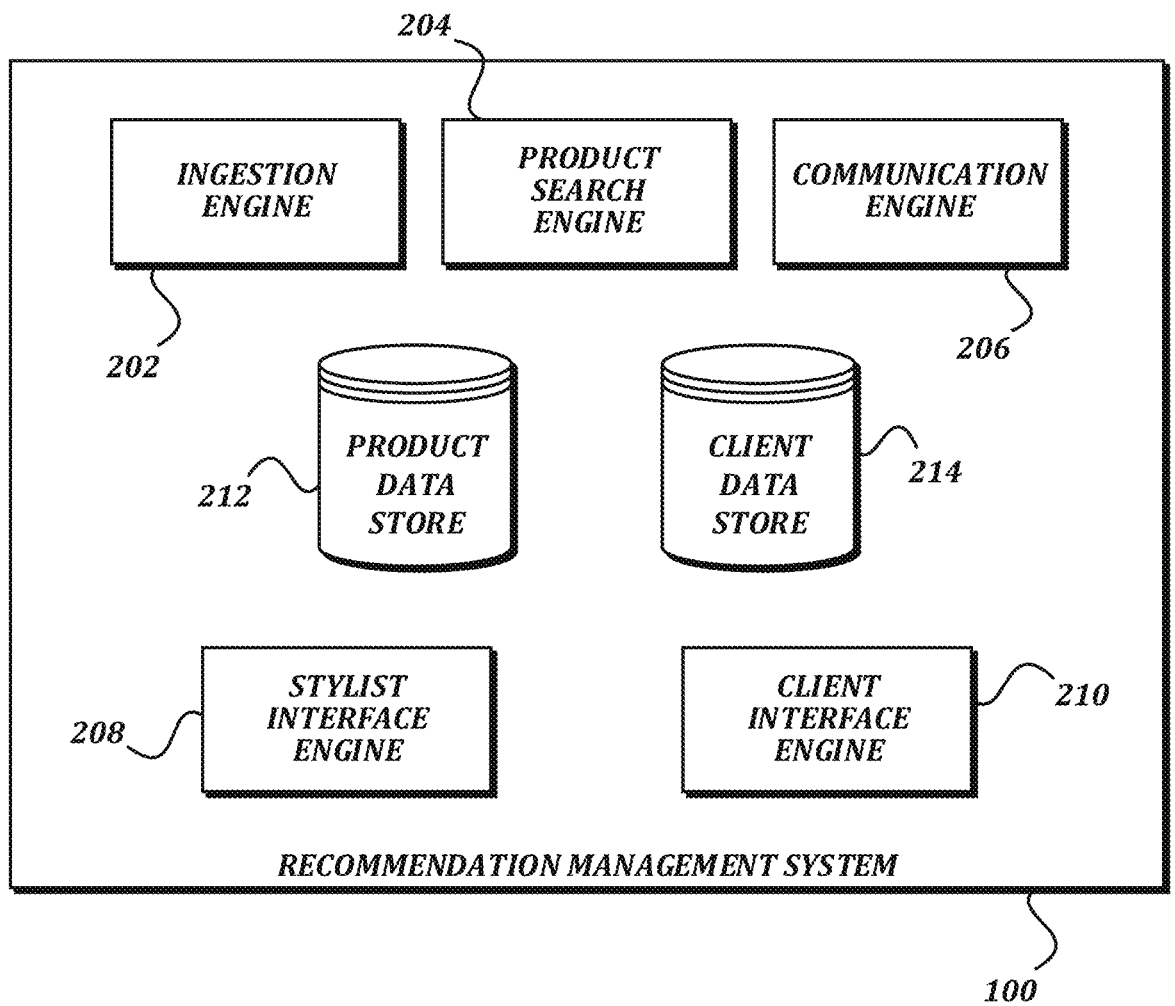
FIG. 2 is a block diagram that illustrates an example embodiment of a recommendation management system according to various aspects of the present disclosure.

FIG. 2 is a block diagram that illustrates an example embodiment of a recommendation management system according to various aspects of the present disclosure. As illustrated, the recommendation management system 100 includes an ingestion engine 202, a product search engine 204, a communication engine 206, a stylist interface engine 208, a client interface engine 210, a product data store 212, and a client data store 214.

In some embodiments, the ingestion engine 202 is configured to receive product information from retailer systems 108 and/or retailer aggregation systems 110 via the network 90. The ingestion engine 202 may be configured to normalize product information from disparate sources into a common format, and to store the information in the product data store 212. The ingestion engine 202 may also be configured to update information stored in the product data store 212 based on the received product information.

In some embodiments, the product search engine 204 is configured to search the product data store 212 for product records in response to search queries received by the stylist interface engine 208. The product search engine 204 may be configured to deduplicate, rank, filter, group, or otherwise process the product records retrieved from the product data store 212 before returning the product records as search results.

In some embodiments, the communication engine 206 is configured to transmit information from the recommendation management system 100 to client computing devices 102 and/or stylist computing devices 104 outside of the interfaces generated by the stylist interface engine 208 and the client interface engine 210. In some embodiments, the communication engine 206 may be configured to use communication provider systems 112 to transmit notifications to clients and/or stylists.

In some embodiments, the stylist interface engine 208 is configured to help generate a user interface suitable for use by stylists. In some embodiments, the stylist interface engine 208 may generate a web-based interface such as a web site, and provide the web site for presentation by stylist computing devices 104. In some embodiments, the stylist interface engine 208 may provide a programmatically accessible application programming interface (API), which is then accessed by software such as a downloadable application or an app executing on the stylist computing devices 104 in order to generate the user interface. Actions performed through the interface generated by the stylist interface engine 208 are described below.

In some embodiments, the client interface engine 210 is configured to help generate a user interface suitable for use by clients. As with the stylist interface engine 208, in some embodiments, the client interface engine 210 may generate a web-based interface such as a web site, and provide the web site for presentation by client computing devices 102. In some embodiments, the client interface engine 210 may provide a programmatically accessible application programming interface (API), which is then accessed by software such as a downloadable application or an app executing on the client computing devices 102 in order to generate the user interface. Actions performed through the interface generated by the client interface engine 210 are described below.

In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

In some embodiments, the product data store 212 is configured to store product records that have been generated based on product information received from retailer systems 108 and/or retailer aggregation systems 110. In some embodiments, the client data store 214 is configured to store client information, including but not limited to style preference information and style board information.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium such as a hard drive, flash memory, or RAM. One of ordinary skill in the art will recognize that separate data stores described herein may be combined into a single data store, and/or a single data store described herein may be separated into multiple data stores, without departing from the scope of the present disclosure.

Further details about the functionality provided by each of the components of the recommendation management system 100 are provided below.

Figure 3A:
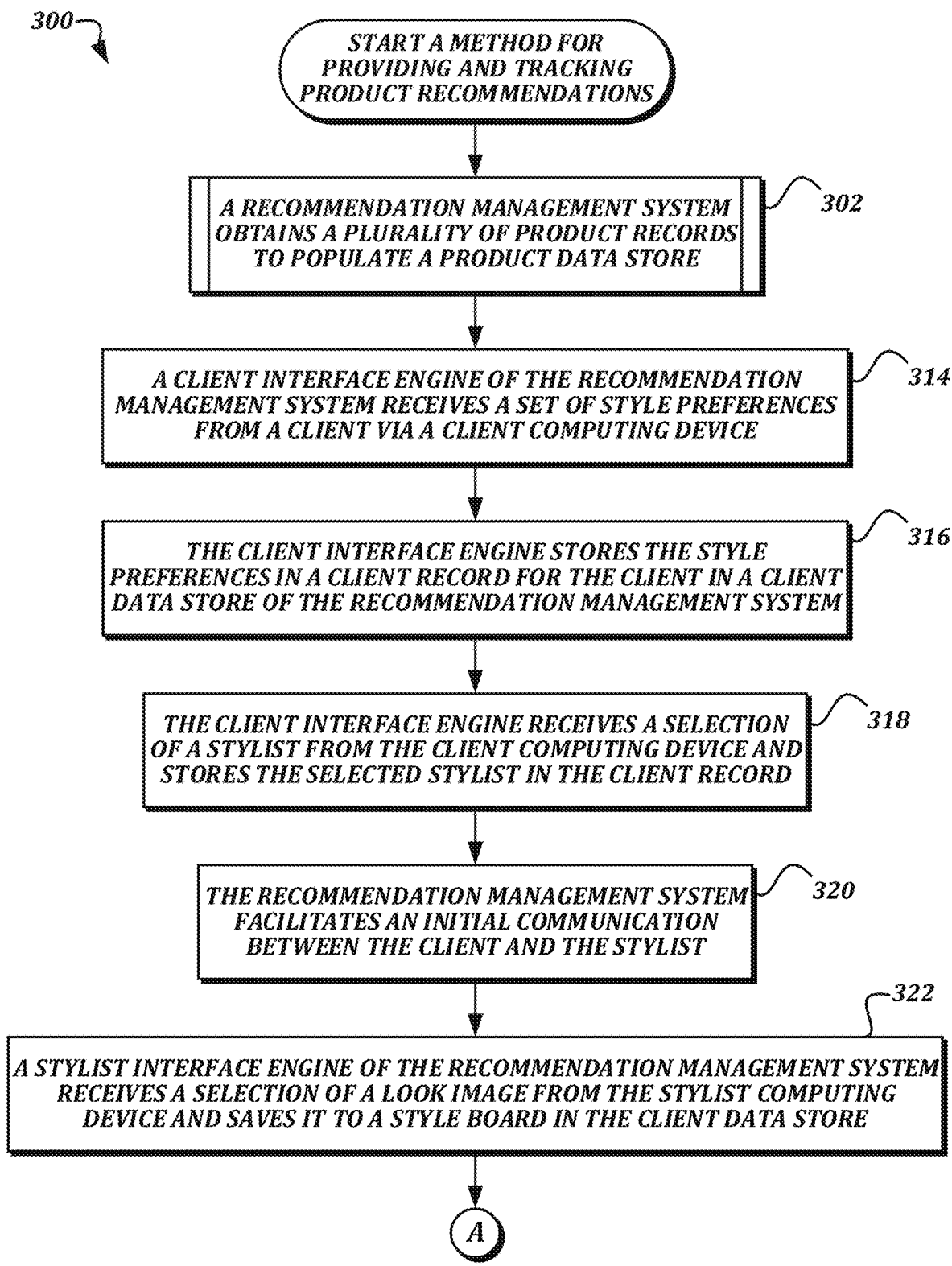
FIGS. 3A-3B are a flowchart that illustrates an example embodiment of a method for providing and tracking product recommendations according to various aspects of the present disclosure.
Figure 3B:
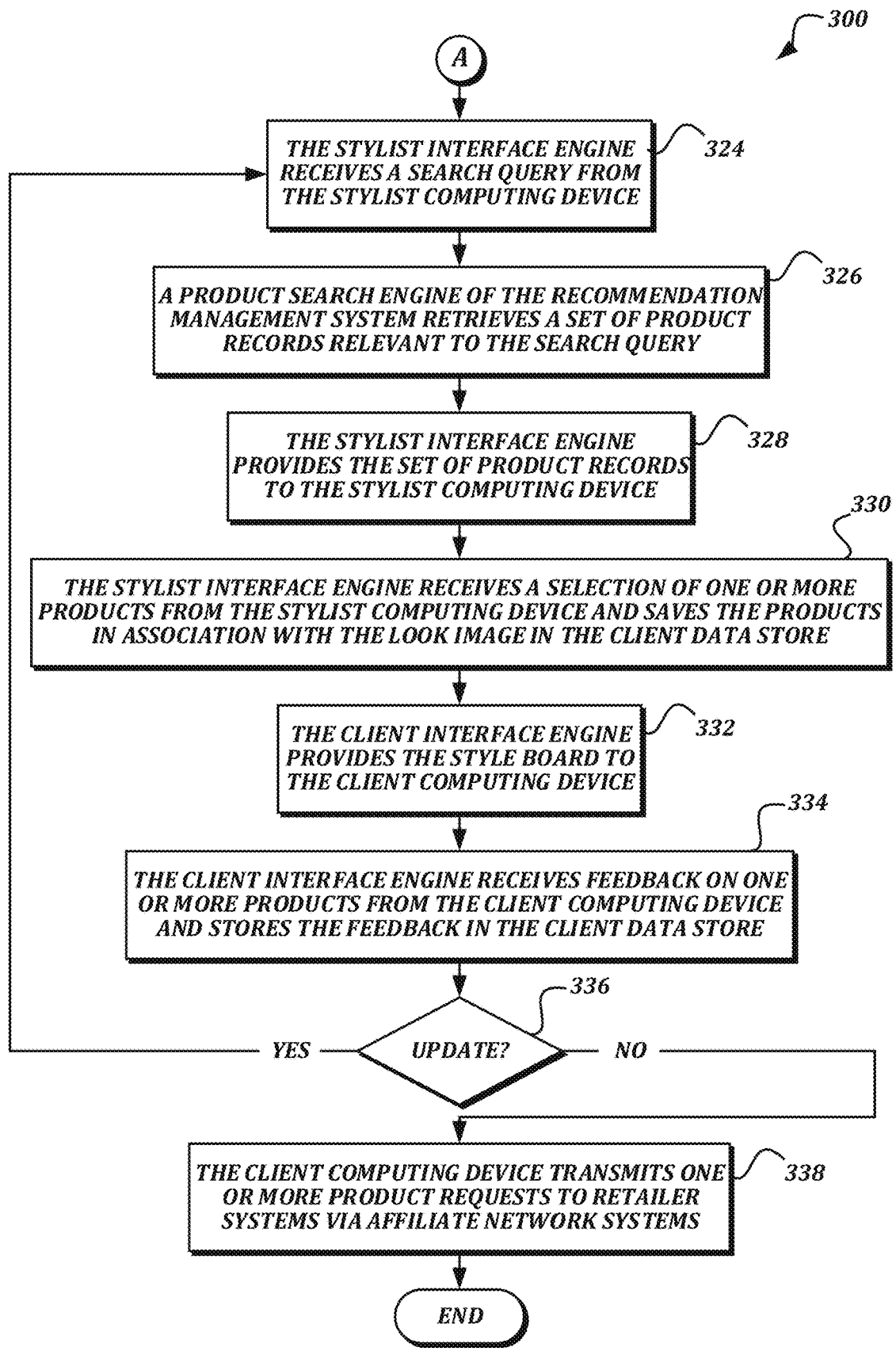

FIGS. 3A-3B are a flowchart that illustrates an example embodiment of a method for providing and tracking product recommendations according to various aspects of the present disclosure. From a start block, the method 300 proceeds to procedure block 302, where a recommendation management system 100 obtains a plurality of product records to populate a product data store 212. Any suitable procedure may be used in procedure block 302 to obtain the product records to be stored in the product data store 212, including but not limited to the procedure 1100 illustrated in FIGS. 11A-11B and described in further detail below.

At block 314, a client interface engine 210 of the recommendation management system 100 receives a set of style preferences from a client via a client computing device 102. In some embodiments, the interface generated by the client interface engine 210 may include a questionnaire that includes flags for various types of styles, clothing sizes, or other values; text blocks or image submission controls for the client to provide descriptions or illustrations of preferred styles; interface controls to specify preferred budget ranges; and/or any other type of question that can gather information relevant to the client's style preferences and/or styling goals. In some embodiments, the questionnaire is generated by the client interface engine 210, and is transmitted to the client computing device 102 for presentation to the client as part of the interface. The client enters the questionnaire responses into the interface presented by the client computing device 102, and the client interface engine 210 receives the responses.

Figure 4:
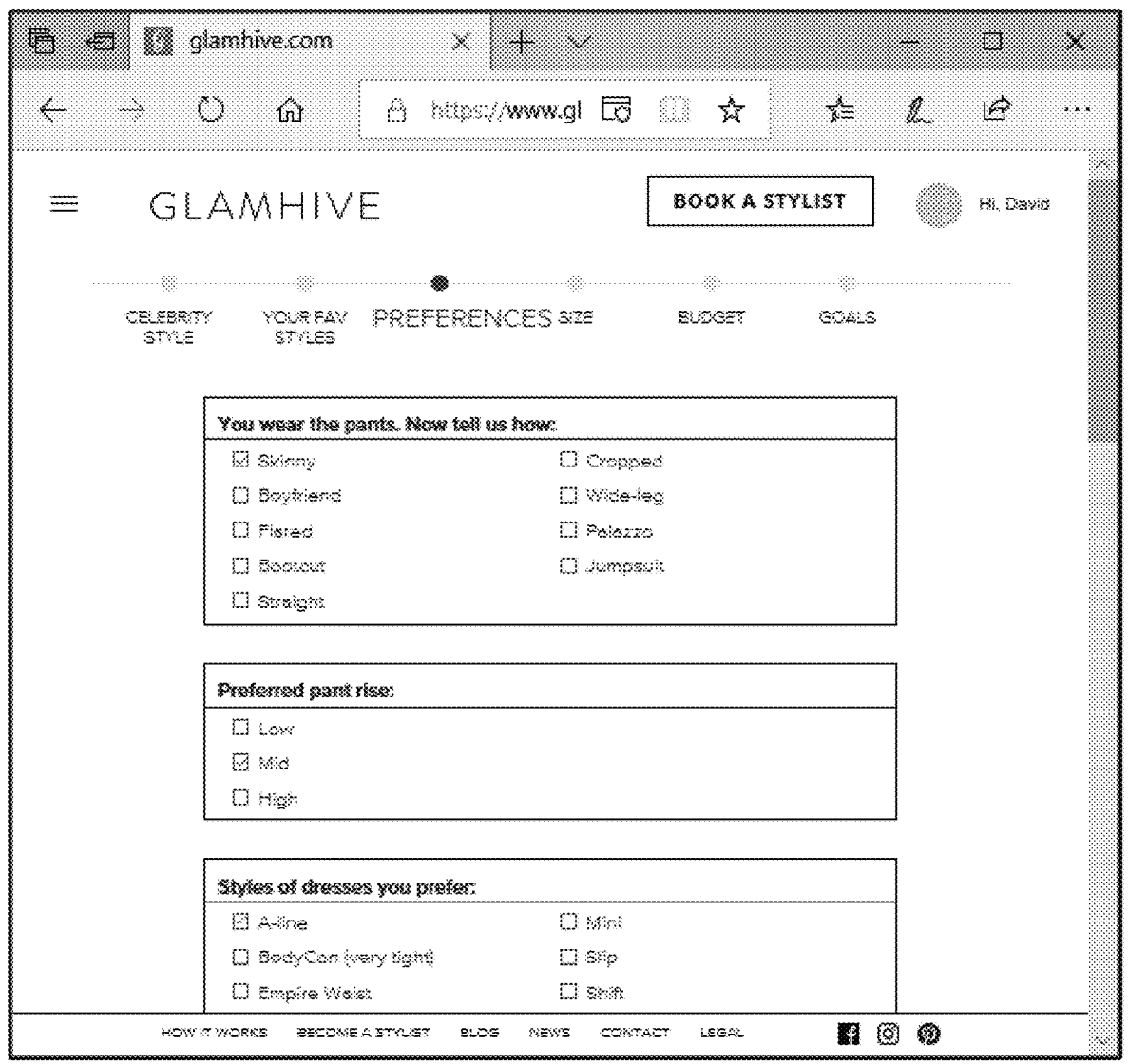
FIG. 4 is an illustration of an example embodiment of an interface that includes a questionnaire presented by a client computing device according to various aspects of the present disclosure.

FIG. 4 is an illustration of an example embodiment of an interface that includes a questionnaire presented by a client computing device according to various aspects of the present disclosure. As shown, the interface includes three sets of flags that specify various style preferences. Other pages available within the questionnaire interface provide the ability to specify information for sizes, budgets, and goals. Still other pages available within the questionnaire interface provide the ability to specify images of celebrity styles or personal styles that the client prefers.

Returning to FIG. 3A, from block 314, the method 300 proceeds to block 316, where the client interface engine 210 stores the style preferences in a client record for the client in a client data store 214 of the recommendation management system 100. At block 318, the client interface engine 210 receives a selection of a stylist from the client computing device 102 and stores the selected stylist in the client record. The stylist may be selected within the interface provided by the client computing device 102 from a list of stylists. The selected stylist may be stored in the same client record as the style preferences, or within a separate record or separate data store, though it has been described as being stored in the client record for the sake of clarity. In some embodiments, the client may be paired with the stylist by browsing stylist listings, biographies, sample portfolios, and/or other information made available within the interface generated by the client interface engine 210. In some embodiments, the client may be paired with a stylist by a matchmaking service based on the questionnaire responses.

The method 300 then proceeds to block 320, where the recommendation management system 100 facilitates an initial communication between the client and the stylist. In some embodiments, the communication engine 206 may transmit notifications to both the client and the stylist using a communication provider system 112 to inform them that they have matched and to share anonymized contact information (or a communication location such as a chat interface provided by the recommendation management system 100) in order for the client and the stylist to arrange a telephone call or video conference. In some embodiments, the communication engine 206 may schedule the telephone call or video conference, and then utilize a communication provider system 112 to host the actual communication. In some embodiments, the scheduling of the meeting by the communication engine 206 allows the recommendation management system 100 to track time spent during consultations for billing purposes, and/or to allow stylists to de-conflict the scheduling of multiple consultations.

At block 322, a stylist interface engine 208 of the recommendation management system 100 receives a selection of a look image from the stylist computing device 104 and saves it to a style board in the client data store 214. In some embodiments, the look image may be selected by the stylist from images provided in the interface generated by the stylist interface engine 208. In some embodiments, the look image may be uploaded by the stylist via the stylist computing device 104. In some embodiments, the look image may be shared by the stylist via a social network and may be retrieved from the social network by the recommendation management system 100. In some embodiments, the client and the stylist may collaborate to choose the look image. For example, the client and stylist may choose the look image during the initial consultation. As another example, the interface provided by the client interface engine 210 may allow the client to provide one or more look images to the stylist as suggestions or preferences.

Figure 5:
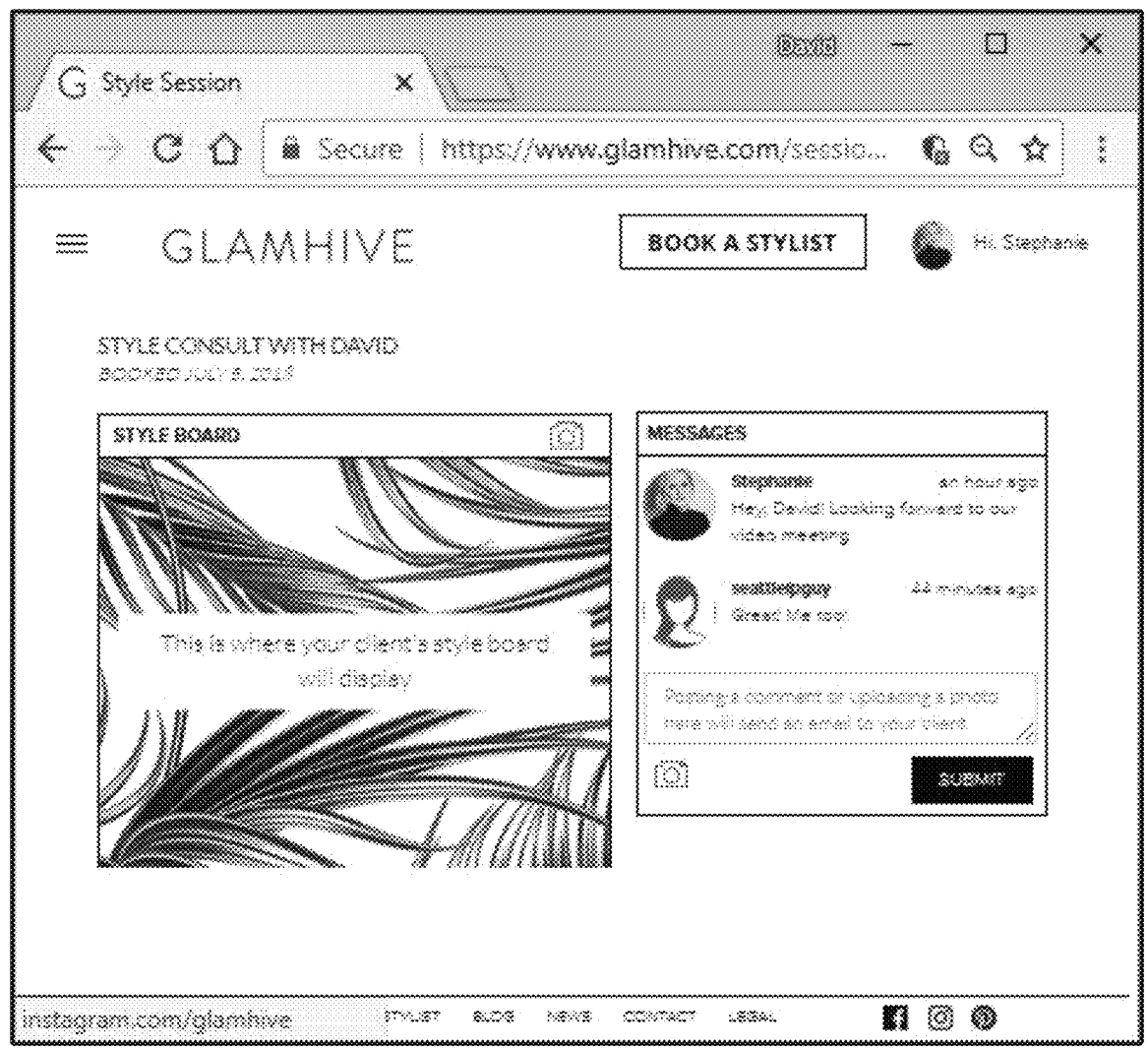
FIG. 5 is an illustration of an example embodiment of an interface presented by a stylist computing device according to various aspects of the present disclosure.

FIG. 5 is an illustration of an example embodiment of an interface presented by a stylist computing device according to various aspects of the present disclosure. As shown in FIG. 5, the interface includes a chat interface that allows the stylist and the client to communicate in order to share preferences and to schedule phone or video conferences for in-depth discussions. As shown, submitting chat messages within the displayed interface may cause the communication engine 206 to have an email, SMS message, or other communication sent to the other party. The interface as shown also includes a blank "style board," which is where the stylist may provide their recommendations to the client. Clicking on the camera icon may allow the stylist to upload a look image to the style board or to obtain an image to add to the style board in some other way.

Returning to FIG. 3A, from block 322 the method 300 proceeds to a continuation terminal ("terminal A"). From terminal A (FIG. 3B), the method 300 proceeds to block 324, where the stylist interface engine 208 receives a search query from the stylist computing device. In some embodiments, the search query may include keywords, filter terms, budget ranges, retailer preferences, result ordering preferences, and/or any other suitable parameter. In some embodiments, the search query may be for products that appear in the look image, or for products that do not necessarily appear in the look image but are inspired by the look image.

Figure 6:
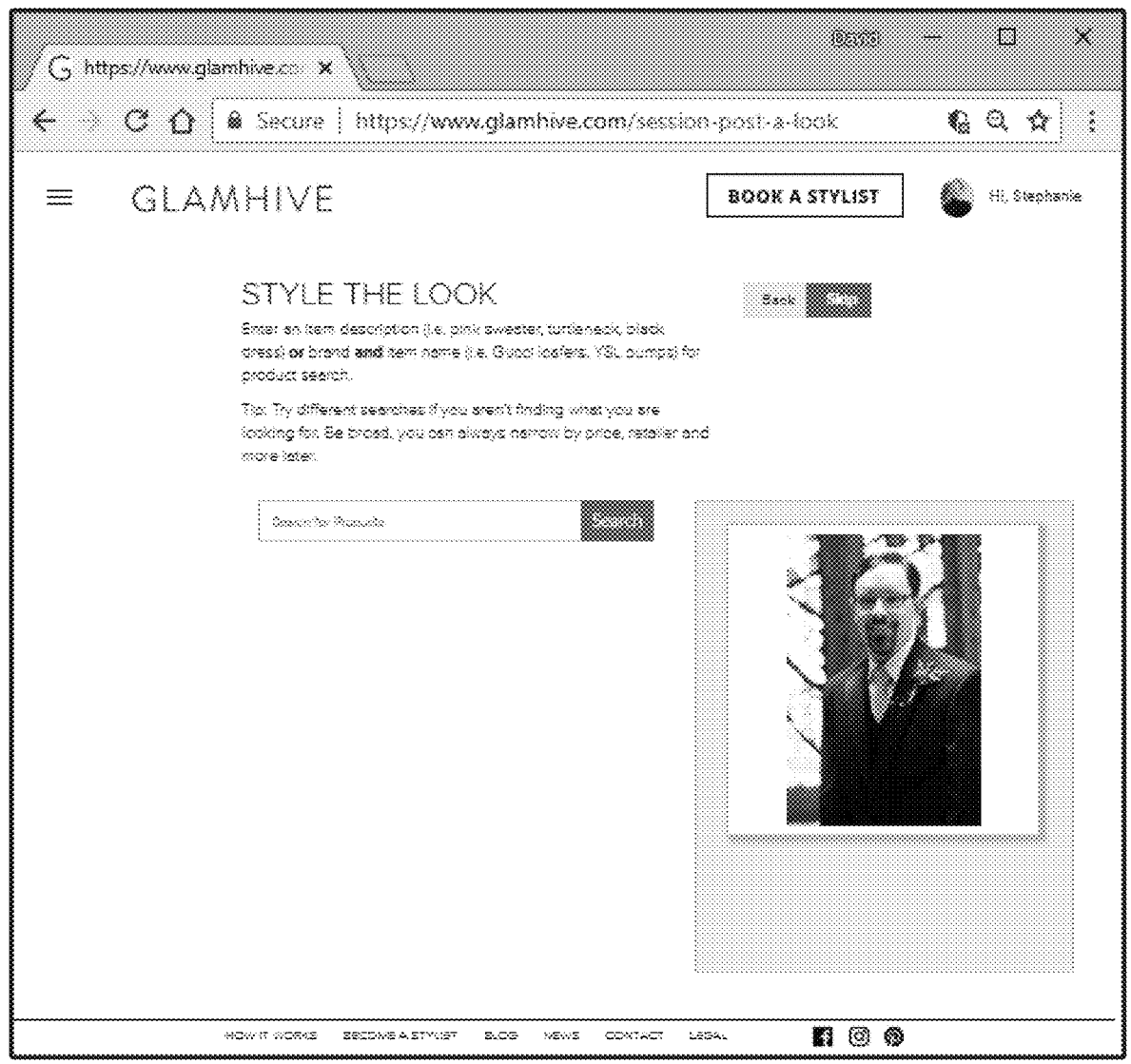
FIG. 6 is an illustration of an example embodiment of a query interface presented by a stylist computing device according to various aspects of the present disclosure.

FIG. 6 is an illustration of an example embodiment of a query interface presented by a stylist computing device 104 according to various aspects of the present disclosure. The illustrated query interface is presented to the stylist after the look image, which appears on the right side of the interface, has been uploaded/selected. A search box appears on the left side of the interface, and may receive one or more search terms submitted by the stylist.

Returning to FIG. 3B, at block 326, a product search engine 204 of the recommendation management system 100 retrieves a set of product records relevant to the search query. In some embodiments, the product search engine 204 may use the text entered into the search box to perform a keyword search over the product records within the product data store 212. In some embodiments, the search performed on the product data store 212 may include further filters or sort orders based on the style preferences stored in the client data store 214. For example, the search may filter out product records that do not match a budget range or a size specified in the style preferences. In some embodiments, the search may rank the results based on one or more system configuration settings, such as a retailer preference, as configured by an operator of the recommendation management system 100. In some embodiments, the search may rank the results based on products or styles that are trending, which may be determined by recommendations made by the same stylists (or other stylists) for other, similar clients. In some embodiments, the search may rank the results based on stylist preferences for particular brands or retailers. In some embodiments, the search may rank the results based on regional preferences (e.g., products that are trending in a region of the client).

At block 328, the stylist interface engine 208 provides the set of product records to the stylist computing device 104. Next, at block 330, the stylist interface engine 208 receives a selection of one or more products from the stylist computing device 104 and saves the products in association with the look image in the client data store 214. In this way, the stylist can curate a collection of recommended products for the client that can then be presented to the client as being inspired by or otherwise associated with the look image.

Figure 7:
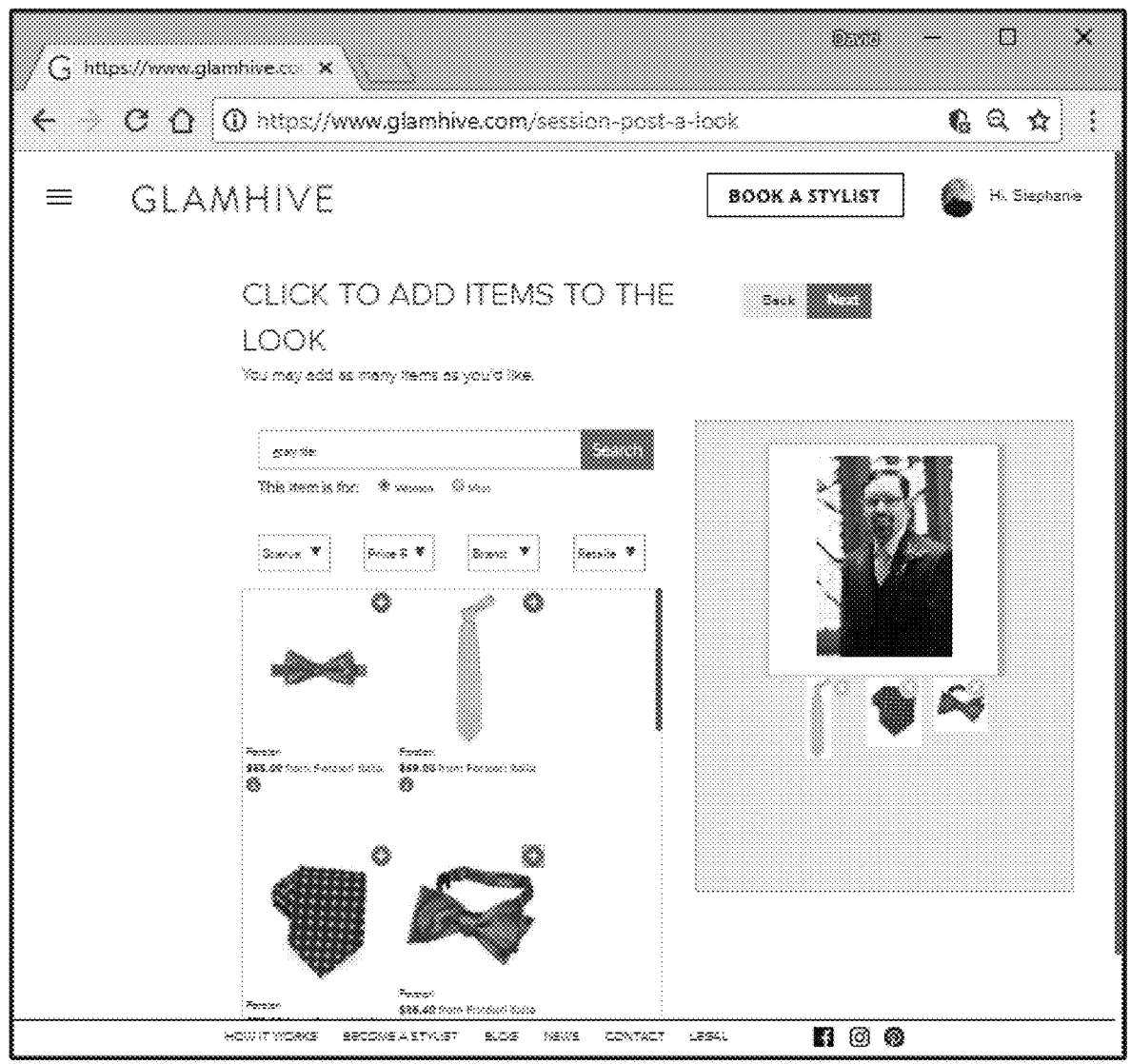
FIG. 7 is an illustration of an example embodiment of a query result interface presented by a stylist computing device according to various aspects of the present disclosure.

FIG. 7 is an illustration of an example embodiment of a query result interface presented by a stylist computing device according to various aspects of the present disclosure. As shown, a grid of product listings appears on the left side of the interface. Above the product listing grid is a set of filter options that allow the stylist to filter the search results by type, price point, brand, and retailer. In some embodiments, other filters and/or sorting options may be made available. Clicking on a product image may cause a product detail page to be presented that includes further information on the product. Clicking the "plus" sign in a search result may cause the product to be added to the style board. As shown, three products from the search results have been added to the style board, and appear below the look image on the right side of the interface.

Figure 8:
FIG. 8 is an illustration of an example embodiment of a style board transmission interface presented by a stylist computing device according to various aspects of the present disclosure.

FIG. 8 is an illustration of an example embodiment of a style board transmission interface presented by a stylist computing device according to various aspects of the present disclosure. As shown, the style board transmission interface allows the stylist to review the look image and the products that have been added to the style board, and to add a message to the client to explain the choices made. Upon submitting the message, the communication engine 206 may use a communication provider system 112 to transmit the message to the client and prompt them to visit the style board to review the selected products.

Figure 9:
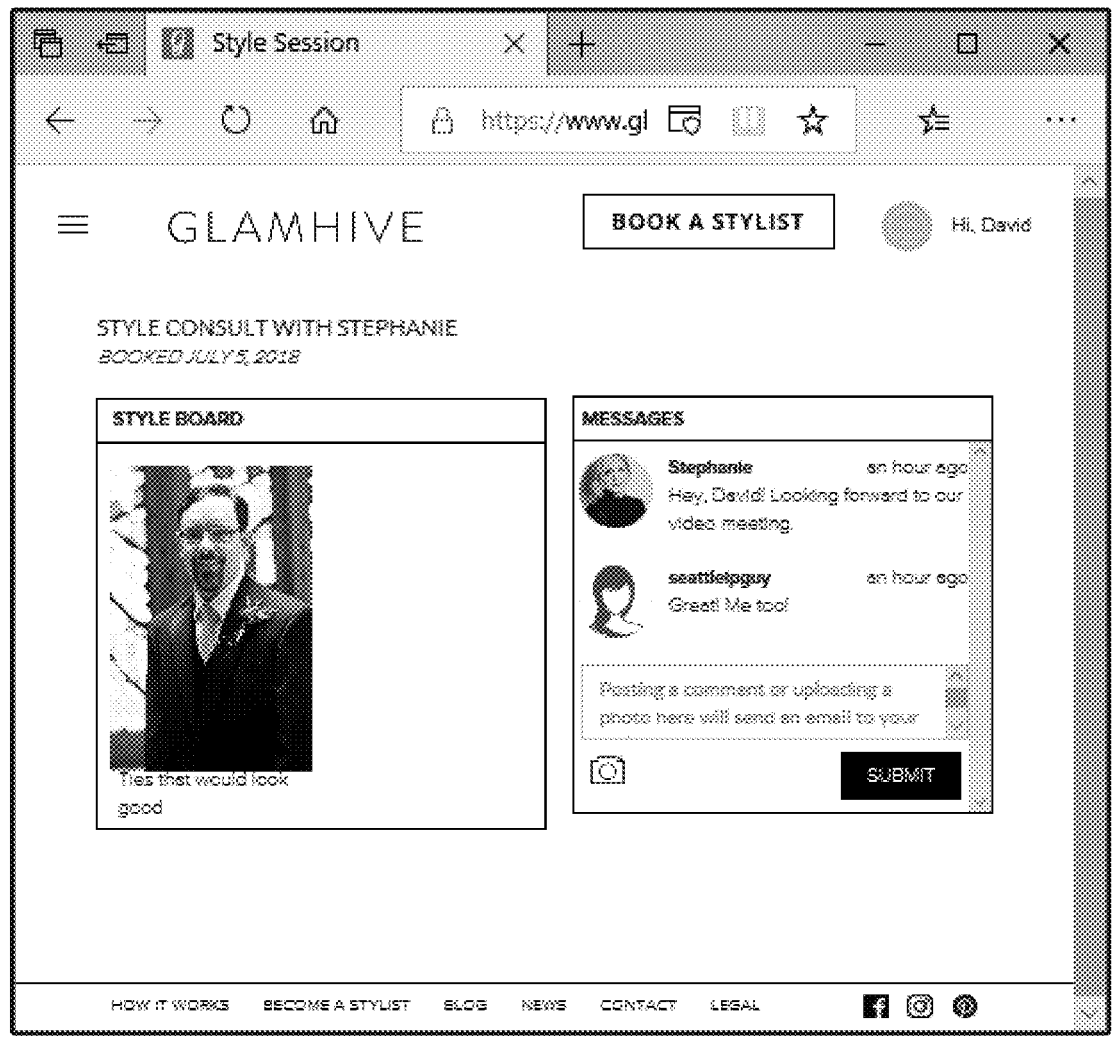
FIG. 9 is an illustration of an example embodiment of a style board interface presented by a client computing device according to various aspects of the present disclosure.

Returning to FIG. 3B, at block 332, the client interface engine 210 provides the style board to the client computing device 102. FIG. 9 is an illustration of an example embodiment of a style board interface presented by a client computing device according to various aspects of the present disclosure. As illustrated, the style board interface includes the look image, as well as the title of the message that the stylist entered into the style board transmission interface. The communication interface illustrated and described above with respect to FIG. 5 is also shown. Upon clicking on the look image, a style board detail interface may be presented.

Figure 10:
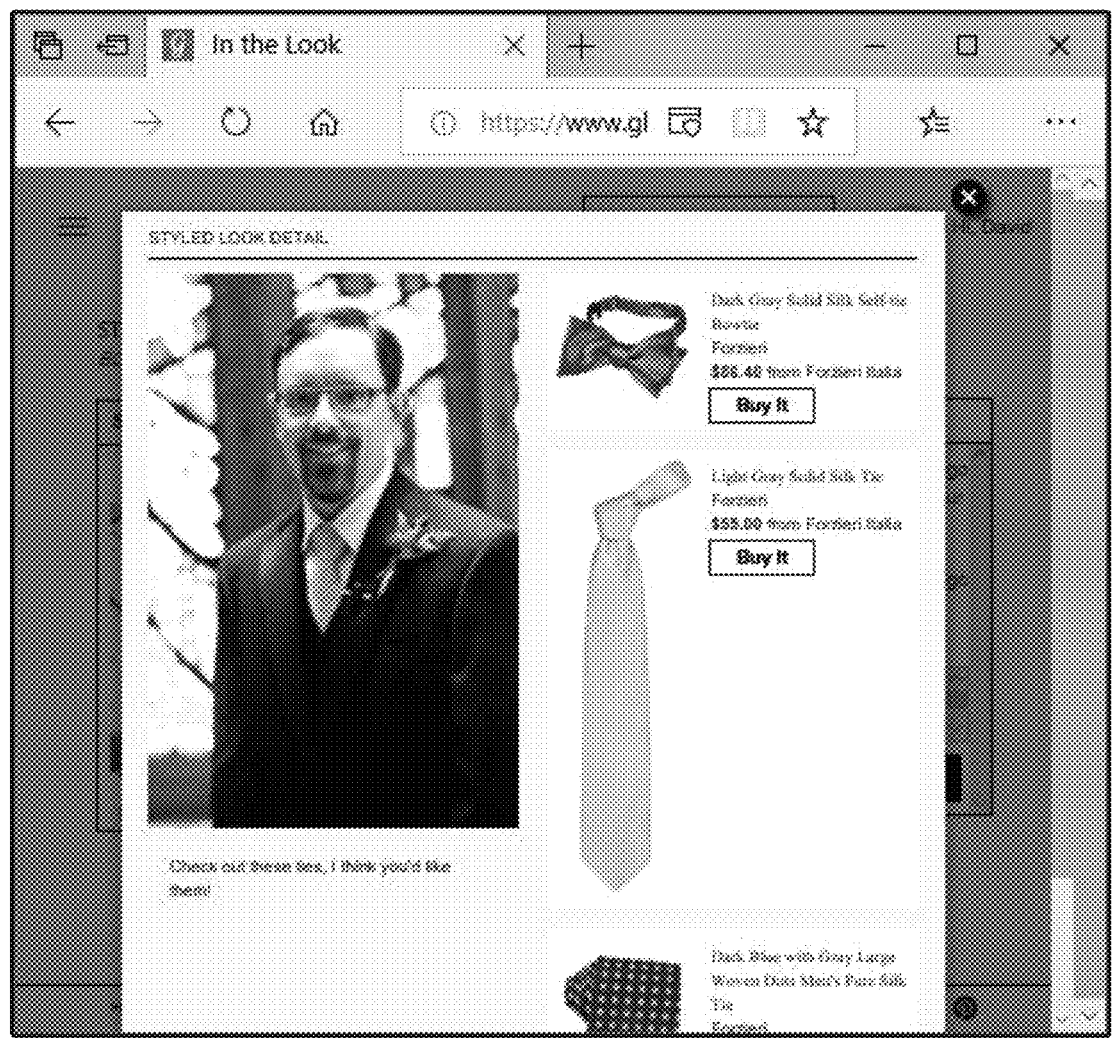
FIG. 10 is an illustration of an example embodiment of a style board detail interface presented by a client computing device according to various aspects of the present disclosure.

FIG. 10 is an illustration of an example embodiment of a style board detail interface presented by a client computing device according to various aspects of the present disclosure. As shown, the style board detail interface includes a larger version of the look image, as well as a listing of the products added to the style board by the stylist. Each of the product listings includes a "buy it" button. In some embodiments, these buttons include affiliate links from the product records. The affiliate link links to a tracking system, which may be either a retailer aggregation system 112 or an affiliate network system 106. The tracking system referenced by the affiliate link records details about the click-through transaction, and then redirects the client computing device 102 to the appropriate retailer system 108 in order to visit a product page where the product can be purchased. In some embodiments, the "buy it" buttons link to the recommendation management system 100, which may then record the click-through for purposes of the recommendation management system 100, and then redirect the client computing device 102 to the affiliate link associated with the product record to allow the affiliate network system 106 to conduct its own tracking for affiliate attribution purposes.

Returning to FIG. 3B, at block 334, the client interface engine 210 receives feedback on one or more products from the client computing device 102 and stores the feedback in the client data store 214. In some embodiments, the feedback may be provided through explicit feedback links provided in the product listings (e.g., a thumbs-up/thumbs-down interface; an upvote/downvote interface, and/or the like). In some embodiments, explicit feedback may be collected using text responses provided in the form of a message to the stylist through the communication interface. In some embodiments, feedback may be collected implicitly in the form of a click-through on a purchase link or a product detail link (being positive feedback) or the lack of a click-through (negative feedback). In some embodiments, this feedback may be stored in the client data store 214 and used to update client preferences. In some embodiments, this feedback may be stored in the product data store 212 and used to rank product search results.

The method 300 then proceeds to decision block 336, where a determination is made regarding whether the style board should be updated. In some embodiments, the feedback on the products may be used to determine whether the style board should be updated. For example, if the feedback on the products was negative, or if no clicks on the products were tracked, then it may be determined that the style board should be updated to provide products that the client would like. As another example, the stylist may proactively determine that the style board should be updated in response to the availability of new products, in response to having new ideas for recommendations, or for any other reason. If it is determined that the style board should be updated, then the result of decision block 336 is YES, and the method 300 returns to block 324 to receive new product selections from the stylist. Otherwise, the result of decision block 336 is NO, and the method 300 proceeds to block 338.

At block 338, the client computing device 102 transmits one or more product requests to retailer systems 108 via affiliate network systems 106. As discussed above, the client may click on the affiliate link in the product listing, which links to the affiliate network system 106 for tracking purposes, and then redirects the client computing device 102 to the relevant retailer system 108 to complete the purchase of the product. As also discussed above, this traffic may first be redirected via the recommendation management system 100 to improve the client activity tracking and to obtain other information as well, such as tracking of products that were inspected by the client but did not end up being purchased. In some embodiments, the product link may direct the client directly to the retailer system 108, and the retailer system 108 itself may extract affiliate information from the product link.

As illustrated, the method 300 then proceeds to an end block and terminates. In some embodiments, the client and/or stylist may revisit the recommendation management system 100 in order to further update the style board, further communicate with each other, or browse/purchase further products after the method 300 as illustrated has ended.

Figure 11A:
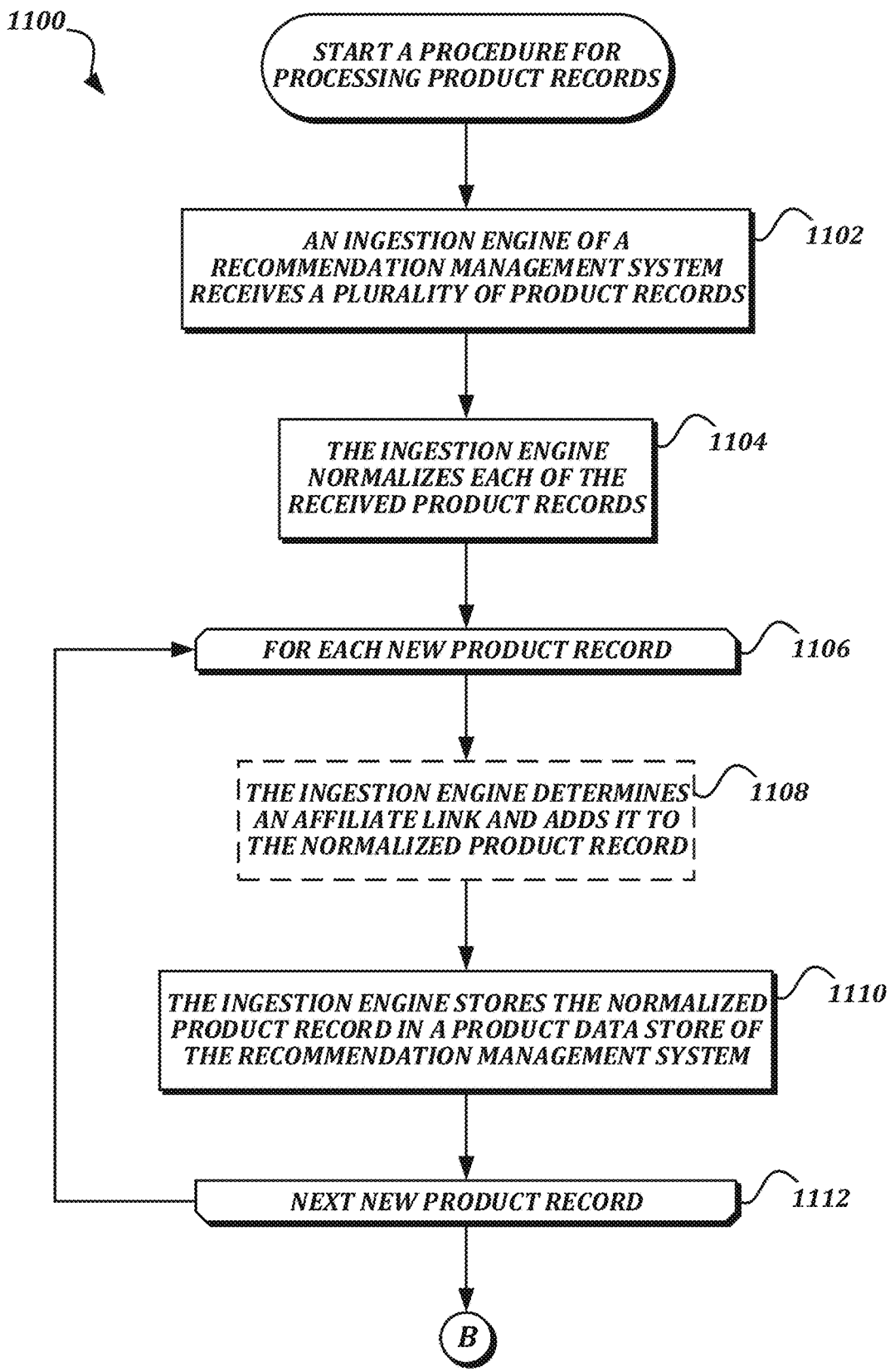
FIGS. 11A-11B are a flowchart that illustrates an example embodiment of a procedure for processing product records according to various aspects of the present disclosure.
Figure 11B:
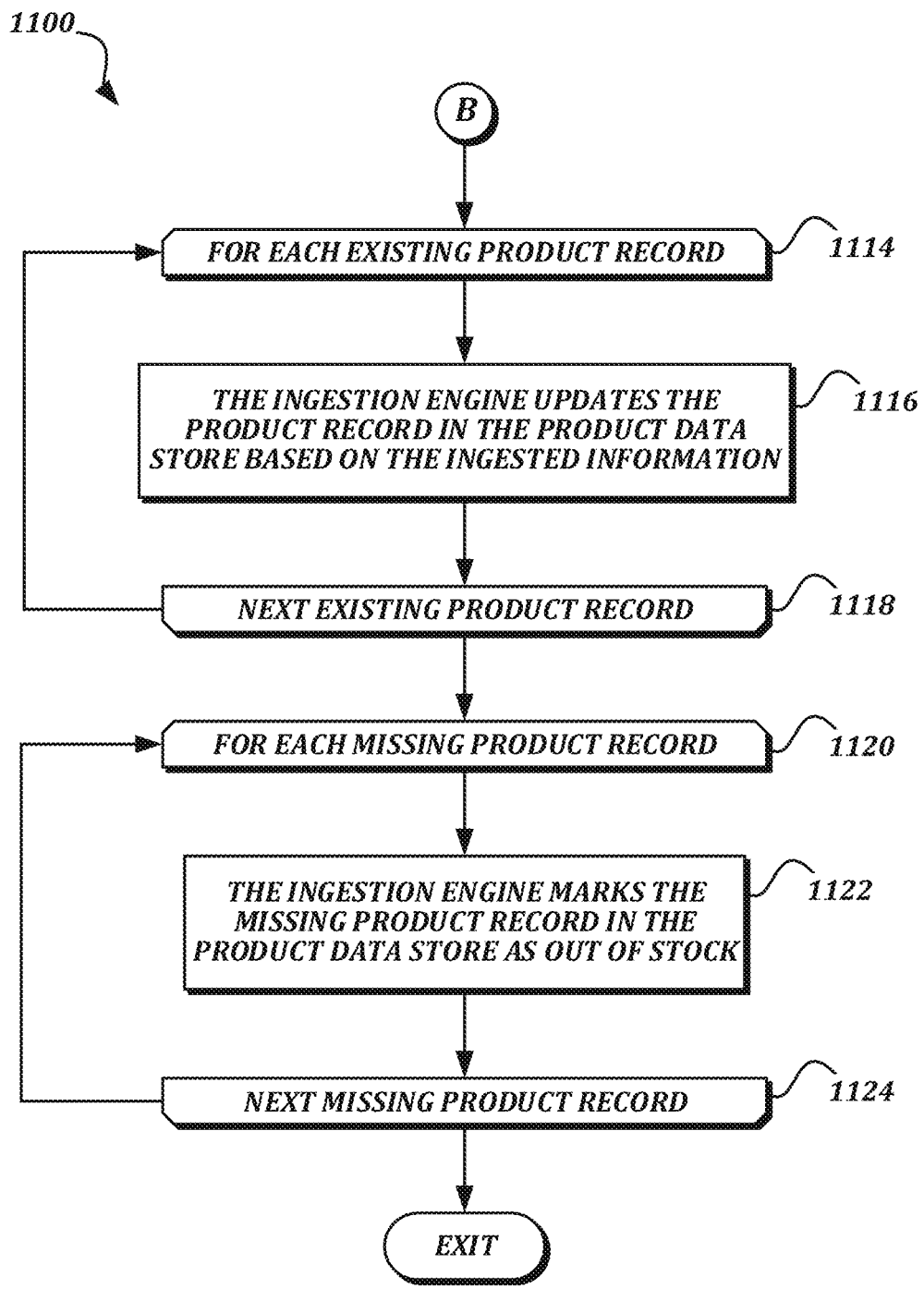

FIGS. 11A-11B are a flowchart that illustrates an example embodiment of a procedure for processing product records according to various aspects of the present disclosure. The procedure 1100 is an example of a procedure suitable for use at procedure block 302. The procedure 1100 may also be used outside of the context of method 300, such as during periodic updates performed to refresh the product records in the product data store 212. Such periodic updates may be performed daily, weekly, or on any other schedule.

From a start block, the procedure 1100 advances to block 1102, where an ingestion engine 202 of a recommendation management system 100 receives a plurality of product records. In some embodiments, the ingestion engine 202 may receive the product records from one or more retailer aggregation systems 110. In some embodiments, the ingestion engine 202 may receive the product records directly from one or more retailer systems 108.

At block 1105, the ingestion engine 202 normalizes each of the received the product records. In some embodiments, the ingestion engine 202 may use a set of rules that map fields of the product record to fields of a normalized product record based on the source of the product record. For example, a rule might state that a "title" field of a product record from a first retailer should be mapped to a "product name" field in the normalized product record. In some embodiments, these rules may be configured programmatically for each record source. In some embodiments, these rules may be configured through a graphical user interface provided to a system administrator by the recommendation management system 100. In some embodiments, normalizing the product record may include grouping similar items together. For example, separate product records for different sizes of a product that is otherwise the same may be grouped together by a product group identifier. As another example, separate product records for the same product offered by separate retailers may be grouped together by a product group identifier. The group identifiers can then be used while searching to improve the search results by returning only one item from each identified group.

The procedure 1100 then advances to a for loop defined between a for loop start block 1106 and a for loop end block 1112, wherein each new product record received by the ingestion engine 202 is processed and stored by the recommendation management system 100. New product records are product records that did not have a corresponding product record (e.g., a product record representing the same product from the same retailer) already stored in the product data store 212.

From the for loop start block 1106, the procedure 1100 advances to optional block 1108, where the ingestion engine 202 determines an affiliate link and adds it to the normalized product record. As discussed above, the affiliate link is a link associated with an affiliate network system 106 and allows a click-through on a product to be attributed to the recommendation management system 100. In some embodiments, the ingestion engine 202 may determine the affiliate link by retrieving a link for the product from an affiliate network system 106. In some embodiments, the ingestion engine 202 may generate the affiliate link by adding an affiliate identifier code that represents the recommendation management system 100 to a product link already included in the product record. The optional block 1108 is illustrated as optional because the affiliate link may have already been included in the product record obtained by the ingestion engine 202 (particularly if the product record was received from a retailer aggregation system 110), and so an additional affiliate link may not have to be added.

At block 1110, the ingestion engine 202 stores the normalized product record in a product data store 212 of the recommendation management system 100. The procedure 1100 then advances to the for loop end block 312. If further new product records remain to be processed, then the procedure 1100 returns to the for loop start block 1106 to process the next new product record. Otherwise, if all of the new product records have been processed, then the procedure 1100 advances to a continuation terminal ("terminal B").

From terminal B (FIG. 11B), the procedure 1100 advances to a for loop defined between a for loop start block 1114 and a for loop end block 1116, wherein a set of existing product records are processed. Existing product records are product records within the product records received by the ingestion engine 202 that do have a corresponding product record (e.g., a product record representing the same product from the same retailer) stored within the product data store 212. The corresponding product record may differ in some respects (e.g. a different price, a different affiliate link, a different description), but would otherwise refer to the same underlying item. In some embodiments, the corresponding product record may be found by comparing a unique product identifier in the ingested product record to unique product identifiers of product records in the product data store 212. After the first time the procedure 1100 is executed to initially populate the product data store 212, it will be common to find corresponding product records.

From the for loop start block 1114, the procedure 1100 advances to block 1116, where the ingestion engine 202 updates the product record in the product data store 212 based on the ingested information. To update the product record, the ingestion engine 202 may copy any information that doesn't match, such as a price, an indication of a sale, an available quantity, a new description, etc., to the product record from the ingested product record. In some embodiments, even if all information matches, the ingestion engine 202 may update a "last updated" timestamp stored in the product record in the product data store 212. In some embodiments, updating the product record may include removing an "out of stock" flag from the product record, if one is present. The procedure 1100 then advances to the for loop end block 1118.

At the for loop end block 1118, if further existing product records remain to be processed, then the procedure 1100 returns to the for loop start block 1114 to process the next existing product record. Otherwise, the procedure 1100 advances to another for loop defined between a for loop start block 1120 and a for loop end block 1124, wherein a set of missing product records are processed. Missing product records are product records stored within the product data store 212 for which corresponding information was not included in the product records received by the ingestion engine 202. In some embodiments, the missing product records may be found by querying the product data store 212 for product records that aren't in the present in the received product records. From the for loop start block 1120, the procedure 1100 advances to block 1122, where the ingestion engine 202 marks the missing product record in the product data store 212 as out of stock. In some embodiments, marking the missing product record as out of stock may include setting an "out of stock" flag in the record. In some embodiments, marking the missing product record in the product data store 212 as out of stock could include deleting the record, though it may be beneficial to retain the product record in order to support analytics, tracking, and other functionality. In some embodiments, the result of marking the product record as out of stock may be to cause the product to be indicated in style boards (such as illustrated in FIG. 10) and/or search results (such as illustrated in FIG. 7) as being out of stock. In some embodiments, the result of marking the product record as out of stock may be to cause the product to be automatically replaced in style boards and/or search results with a like product (such as a product from the same group, like a matching product from a different retailer). In some embodiments, the result of marking the product record as out of stock may be to remove the product from display in search results or style boards.

The procedure 1100 then advances to the for loop end block 1124. If further missing product records remain to be processed, then the procedure 1100 returns to the for loop start block 1120 to process the next product record. Otherwise, the procedure 1100 advances to an exit block and terminates.

The illustration of the processing of missing product records as a for loop operating over query results is an example only. In some embodiments, other techniques may be used in order to reduce the amount of processing time necessary to find missing product records. For example, in some embodiments, the procedure 1100 may mark all product records in the product data store 212 as out of stock before receiving the plurality of product records at block 1102, and may remove the out of stock indications while updating the product records at block 1116. In such embodiments, the for loop 1120-1124 may be omitted because only stored product records that were not updated will remain marked out of stock after for loop end block 1118. Further improvements may be obtained by avoiding the need to mark every product record within the product data store 212 at the beginning of the procedure 1100. For example, in some embodiments, a "last updated" time may be stored in each product record, and the ingestion engine 202 may record the latest time at which product records were received. Accordingly, missing product records could be found (and considered out of stock without editing the records) by comparing the "last updated" time stored in the product record to the time at which product records were last received, and implicitly determining that the product records were missing/the products are out of stock if the "last updated" time in the product records is before the time at which product records were last received.

Figure 12:
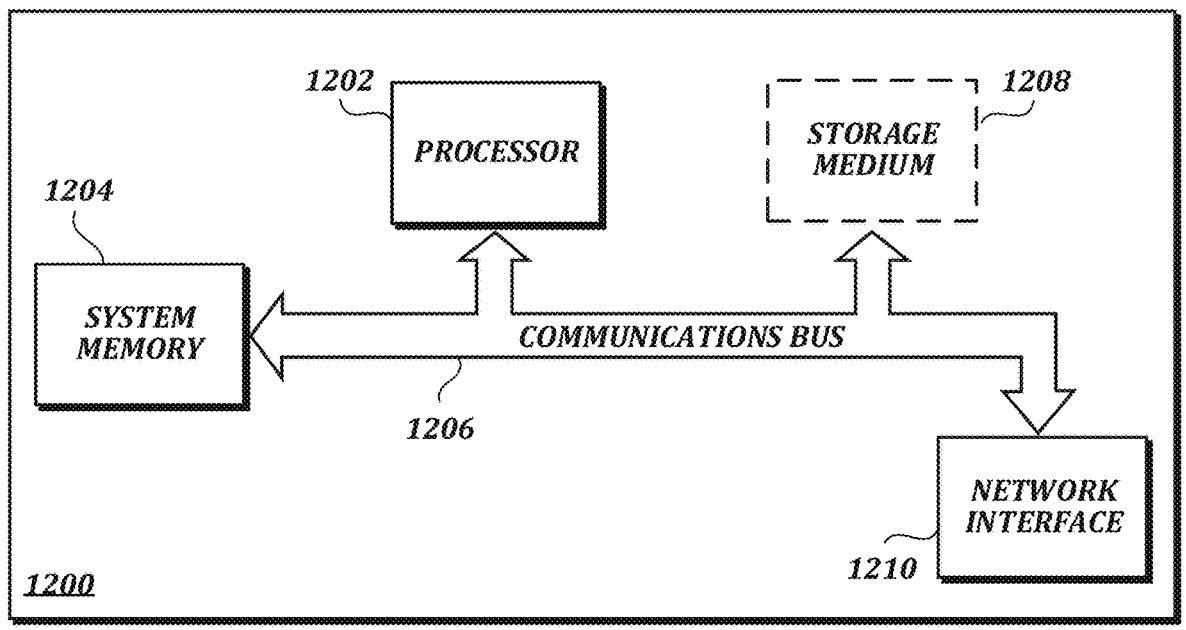
FIG. 12 is a block diagram that illustrates aspects of an example computing device appropriate for use with embodiments of the present disclosure.

FIG. 12 is a block diagram that illustrates aspects of an example computing device appropriate for use with embodiments of the present disclosure. While FIG. 12 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 1200 may be any one of any number of currently available or yet to be developed devices.

In its most basic configuration, the computing device 1200 includes at least one processor 1202 and a system memory 1204 connected by a communication bus 1206. Depending on the exact configuration and type of device, the system memory 1204 may be volatile or nonvolatile memory, such as read only memory ("ROM"), random access memory ("RAM"), EEPROM, flash memory, or similar memory technology. Those of ordinary skill in the art and others will recognize that system memory 1204 typically stores data and/or program modules that are immediately accessible to and/or currently being operated on by the processor 1202. In this regard, the processor 1202 may serve as a computational center of the computing device 1200 by supporting the execution of instructions.

As further illustrated in FIG. 12, the computing device 1200 may include a network interface 1210 comprising one or more components for communicating with other devices over a network. Embodiments of the present disclosure may access basic services that utilize the network interface 1210 to perform communications using common network protocols. The network interface 1210 may also include a wireless network interface configured to communicate via one or more wireless communication protocols, such as WiFi, 2G, 3G, LTE, WiMAX, Bluetooth, and/or the like.

In the exemplary embodiment depicted in FIG. 12, the computing device 1200 also includes a storage medium 1208. However, services may be accessed using a computing device that does not include means for persisting data to a local storage medium. Therefore, the storage medium 1208 depicted in FIG. 12 is represented with a dashed line to indicate that the storage medium 1208 is optional. In any event, the storage medium 1208 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 1204 and storage medium 1208 depicted in FIG. 12 are merely examples of computer-readable media.

Suitable implementations of computing devices that include a processor 1202, system memory 1204, communication bus 1206, storage medium 1208, and network interface 1210 are known and commercially available. For ease of illustration and because it is not important for an understanding of the claimed subject matter, FIG. 12 does not show some of the typical components of many computing devices. In this regard, the computing device 1200 may include input devices, such as a keyboard, keypad, mouse, microphone, touch input device, touch screen, tablet, and/or the like. Such input devices may be coupled to the computing device 1200 by wired or wireless connections including RF, infrared, serial, parallel, Bluetooth, USB, or other suitable connections protocols using wireless or physical connections. Similarly, the computing device 1200 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these FIGURES may graphically represent code to be programmed into a computer readable storage medium associated with a computing device.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method of providing affiliate link-enabled product recommendations, the method comprising:
    receiving, by a computing device, a plurality of product records from at least one retailer system;
    normalizing, by the computing device, the plurality of product records;
    storing, by the computing device, the normalized product records in a product data store;
    receiving, by the computing device from a client computing device, one or more client preferences;
    storing, by the computing device, the one or more client preferences in a client data store;
    receiving, by the computing device, a search query from a stylist computing device that includes one or more keywords;
    retrieving, by the computing device, a plurality of normalized product records from the product data store responsive to the one or more keywords of the search query from the stylist computing device and filtered based on the one or more client preferences from the client computing device;
    transmitting, by the computing device, the plurality of normalized product records to the stylist computing device;
    receiving, by the computing device from the stylist computing device, a selection of normalized product records from the plurality of normalized product records to include in a style board; and transmitting, by the computing device, the style board to the client computing device.

2. The method of claim 1, further comprising:

determining, by the computing device, one or more missing product records in the product data store that do not have corresponding product records in the plurality of product records received from the at least one retailer system; and marking, by the computing device, the one or more missing product records as out of stock.

3. The method of claim 1, further comprising adding, by the computing device, an affiliate link to each normalized product record.

4. The method of claim 1, further comprising:

receiving, by the computing device from the client computing device, feedback on the normalized product records included in the style board;

transmitting, by the computing device, the feedback to the stylist computing device; and receiving, by the computing device, updated product selections from the stylist computing device.

5. A non-transitory computer-readable medium having computer-executable instructions stored thereon that, in response to execution by one or more processors of a computing device, cause the computing device to perform actions for providing affiliate link-enabled product recommendations, the actions comprising:

receiving, by the computing device, a plurality of product records from at least one retailer system;

normalizing, by the computing device, the plurality of product records;

storing, by the computing device, the normalized product records in a product data store;

receiving, by the computing device from a client computing device, one or more client preferences;

storing, by the computing device, the one or more client preferences in a client data store;

receiving, by the computing device, a search query from a stylist computing device that includes one or more keywords;

retrieving, by the computing device, a plurality of normalized product records from the product data store responsive to the one or more keywords of the search query from the stylist computing device and filtered based on the one or more client preferences from the client computing device;

transmitting, by the computing device, the plurality of normalized product records to the stylist computing device;

receiving, by the computing device from the stylist computing device, a selection of normalized product records from the plurality of normalized product records to include in a style board; and transmitting, by the computing device, the style board to the client computing device.

6. The computer-readable medium of claim 5, wherein the actions further comprise:

determining, by the computing device, one or more missing product records in the product data store that do not have corresponding product records in the plurality of product records received from the at least one retailer system; and marking, by the computing device, the one or more missing product records as out of stock.

7. The computer-readable medium of claim 5, wherein the actions further comprise:

receiving, by the computing device from the client computing device, feedback on the normalized product records included in the style board;

transmitting, by the computing device, the feedback to the stylist computing device; and receiving, by the computing device, updated product selections from the stylist computing device.

8. The computer-readable medium of claim 5, wherein the actions further comprise adding, by the computing device, an affiliate link to each normalized product record.

* * * * *